H. F. YOUNG.
DIRIGIBLE HEADLIGHT SUPPORT.
APPLICATION FILED MAR. 8, 1918.

1,284,539.

Patented Nov. 12, 1918.
2 SHEETS—SHEET 1.

Inventor
H. F. Young,
By Victor J. Evans
Attorney

Witnesses

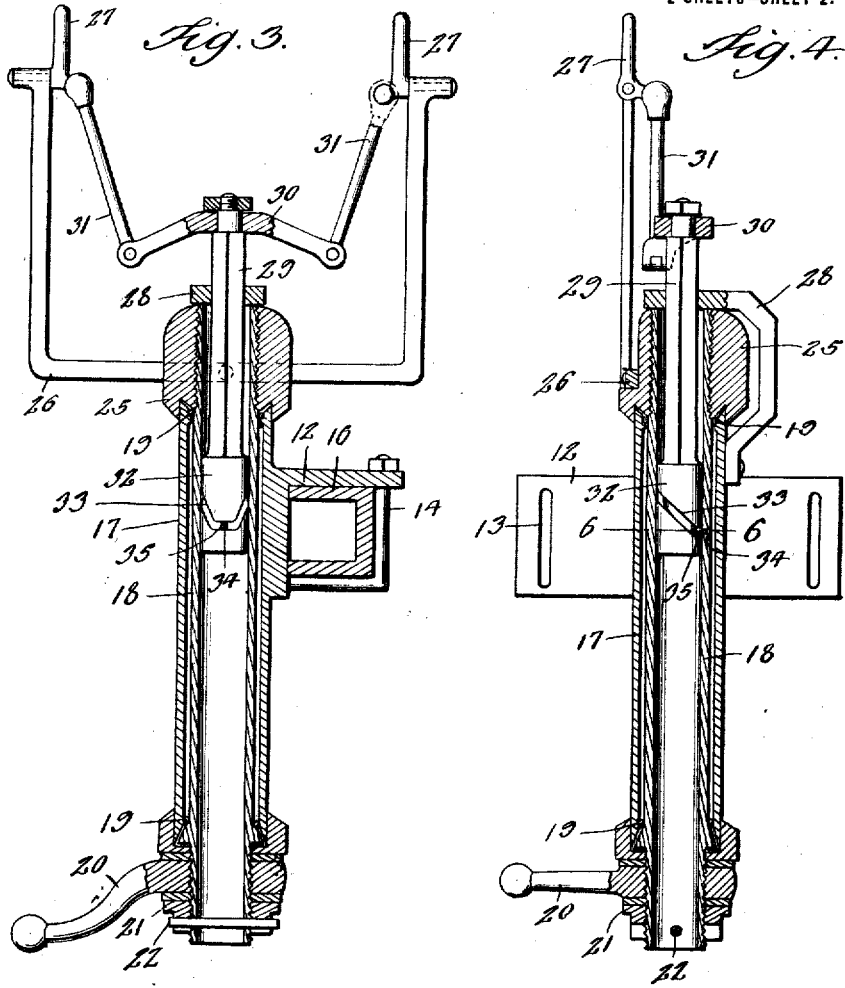

UNITED STATES PATENT OFFICE.

HAROLD F. YOUNG, OF PAINESVILLE, OHIO.

DIRIGIBLE-HEADLIGHT SUPPORT.

1,284,539.  Specification of Letters Patent.  Patented Nov. 12, 1918.

Application filed March 8, 1918. Serial No. 221,223.

*To all whom it may concern:*

Be it known that I, HAROLD F. YOUNG, a citizen of the United States, residing at Painesville, in the county of Lake and State of Ohio, have invented new and useful Improvements in Dirigible-Headlight Supports, of which the following is a specification.

This invention relates to dirigible headlight supports especially adapted to be used upon automobile machines and it consists in the novel features hereinafter described and claimed.

An object of the invention is to provide a support of the character stated which is of simple and durable structure and which may be manipulated to swing or turn the light horizontally and at the same time raise or lower the light vertically and simultaneously with both of said movements to swing the light vertically in order that the rays of the light may be cast upon the ground in close proximity or at considerable distance in front of the automobile machine as desired.

When the machine is traveling in a straight forward direction the light is at its highest position and the rays from the light are cast in a straight-forward direction. When the machine is turned to one side or the other the light is lowered vertically and at the same time it is turned or tilted vertically in order that the rays of light may be passed to one side or the other of the road and directed downwardly in order that the driver may clearly observe any obstructions which may be at the side of the roadway and which might interfere with the passage or movement of the automobile machine. The headlight is operatively connected with the steering gear of the machine and consequently the manipulation or movement of the light is effected at the time that the machine is steered or guided.

In the accompanying drawings:

Fig. 3 is a fragmentary vertical sectional view of the same.

Fig. 4 is a similar view taken on a plane at a right angle to the view as illustrated in Fig. 3.

Fig. 6 is a detail sectional view cut on the line 6—6 of Fig. 4.

Fig. 7 is a fragmentary sectional view of one of the brackets of the support.

Figure 1:
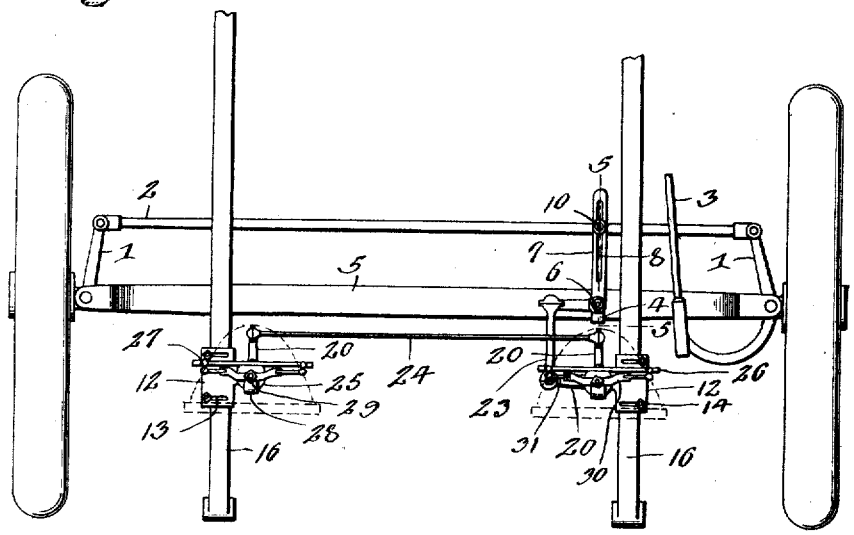
Figure 1 is a top plan view of the dirigible headlight support.
Figure 2:
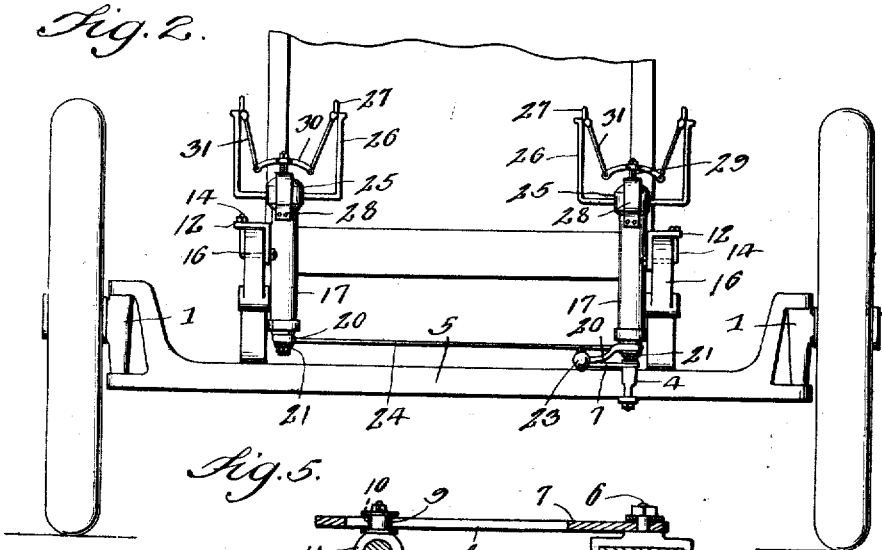
Fig. 2 is a front view of the same.
Figure 5:
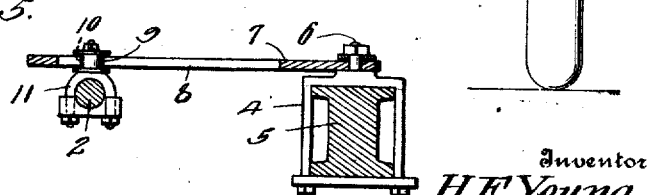
Fig. 5 is a detailed sectional view cut on the line 5—5 of Fig. 1.

As illustrated in the accompanying drawings the knuckles 1 of the automobile's steering gear are connected together by means of a rod 2 in a usual manner. A rod 3 is pivotally connected with one of the knuckles 1 and may be connected with the steering wheel of the automobile machine in a usual manner. A clip 4 is mounted upon the front axle 5 of the automobile machine and the said clip is provided with an upstanding stud 6. A bell crank lever 7 is pivoted upon the stud 6 and one arm of the said lever is provided with a slot 8 which receives a roller 9 journaled upon a stud 10 carried by a clip 11. The clip 11 is clamped in position upon the rod 2.

Consequently it will be seen that as the rod 2 is moved longitudinally whereby the knuckles 1 are simultaneously swung the bell crank lever 7 is rocked upon the clip 4 and the roller 9 may move along the slot 8 thus reducing friction at the point of connection between the rod 2 and the bell crank lever 7 and the said slot 8 is of sufficient length to permit of ample relative adjustment between the parts.

In view of the fact that two light fixtures are employed on a single automobile machine and inasmuch as these fixtures are of the same structural arrangement a description of one will answer for both. Each light fixture includes an angle plate 12 which is provided in the vicinity of its ends with slots 13 adapted to receive the end portions of angle bolts 14 whereby the said plate may be secured in position at the top side of the spring 16 of the automobile machine. A vertically disposed sleeve 17 is fixed to the intermediate portion of the plate 12. A tube 18 is journaled in the sleeve 17 and bearing balls 19 are interposed between the said tube and the sleeve and serve as anti-friction elements for retaining the tube and permitting the same to turn freely within the sleeve.

An angular arm 20 is fixed to the lower end of the tube 18 at a point below the lower end of the sleeve 17 and the said arm is secured in position upon the tube by means of a nut 21 which is screwed upon the lower end of the tube and which bears against the said dam. A lock nut 21 and a nut lock 22 is employed for holding the nut against turning movement upon the tube after the nut has been properly set thereon.

A link 23 is pivotally connected at one end with one of the branches of the arm 20 and pivotally connected at its other end with one of the arms of the bell crank lever as best shown in Fig. 1 of the drawings. Consequently when the bell crank lever 7 is swung as hereinbefore described the link 23 is moved longitudinally whereby the arm 20 is rocked and the tube 18 is turned in the sleeve 17. A rod 24 operatively connects the arm 20 at one side of the automobile machine with the arm 20 at the other side thereof so that the headlights at the opposite sides of the machine are operated simultaneously.

A cap 25 is carried at the upper end of the tube 18 and extends over the upper end of the sleeve 17. A bracket 26 is fixed at a point between its ends to the cap 25 and is adapted to turn with the same. Studs 27 are pivotally mounted at the ends of the brackets 26 and are adapted to swing vertically. The casing of the headlight is adapted to be engaged with the studs 27 and consequently it will be seen that the headlight may be swung horizontally in view of the fact that it is connected with the tube 18 which may turn in the sleeve 17 and the headlight may be swung vertically as it turns horizontally by the means hereinafter described. A guide 28 is fixed to the upper portion of the sleeve 17 and the upper end of the said guide extends over the center of the said sleeve. A shaft 29 is slidably mounted in the guide and an arm 30 is fixed to the upper end of the said shaft 29. Links 31 are pivotally connected at their lower ends with the ends of the arm 30 and the upper outer ends of the said links 31 are pivotally connected with the studs 27 hereinbefore described. A collar 32 is fixed to the lower portion of the shaft 29 and is slidably received in the tube 18. The said collar 32 is provided with a cam groove 33. The tube 18 carries a stud 34 and a roller 35 is journaled upon the said stud and is received within the cam groove 33 of the collar 32. Consequently it will be seen that as the bracket 26 is turned as hereinbefore described the link 31 turns the arm 30 with the bracket. Inasmuch as the arm 30 is fixed to the upper end of the shaft 29 the shaft slides vertically in the tube for the reason that the guide 28 holds the shaft against turning movement therefore as the roller 35 moves along the cam groove 33 the said shaft is raised or lowered and during this raising or lowering movement the links 31 will swing the studs 27 whereby the headlight which is carried by the studs is swung vertically.

Hence it will be seen that when the automobile machine is traveling in a straightforward direction the headlight is at its highest elevation and is directed forwardly in a straight line with the line of movement of the machine. When the operator moves the steering gear to turn the machine to one side or the other the headlight is swung in the direction in which the machine is about to be turned and at the same time it is swung vertically from a substantially horizontal position to a forwardly and downwardly inclined position whereby the rays of light are cast to one side and down upon the ground in order that the operator may clearly observe the condition of the road at the side of the straight line of travel and hence he may avoid obstructions which may be located at the side of the road.

Having described the invention what is claimed is:—

A light support comprising a plate adapted to be attached to an automobile machine, a sleeve carried by the plate, a tube journaled in the sleeve, means for turning the tube, a bracket fixed with relation to the tube, studs pivoted upon the bracket, a shaft slidably mounted in the tube, means connected with the shaft and tube whereby the shaft is moved vertically when the tube is turned horizontally, and means operatively connecting the shaft with the studs.

In testimony whereof I affix my signature.

HAROLD F. YOUNG.